United States Patent
Zhao et al.

(10) Patent No.: US 12,403,539 B2
(45) Date of Patent: Sep. 2, 2025

(54) STANDPIPE RECIRCULATION SYSTEMS FOR MATERIAL REMOVAL MACHINES

(71) Applicant: ILLINOIS TOOL WORKS INC., Glenview, IL (US)

(72) Inventors: Yun Zhao, Shanghai (CN); Calvin States Nelson, Grayslake, IL (US); Roland Schaffer, Gurnee, IL (US); Timothy Weber, Vernon Hills, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 18/022,214

(22) PCT Filed: Sep. 16, 2020

(86) PCT No.: PCT/CN2020/115577
§ 371 (c)(1),
(2) Date: Feb. 20, 2023

(87) PCT Pub. No.: WO2022/056723
PCT Pub. Date: Mar. 24, 2022

(65) Prior Publication Data
US 2023/0311221 A1    Oct. 5, 2023

(51) Int. Cl.
*B23D 59/02*   (2006.01)
*B01D 17/02*   (2006.01)
*B23Q 11/10*   (2006.01)

(52) U.S. Cl.
CPC .......... *B23D 59/02* (2013.01); *B01D 17/0208* (2013.01); *B23Q 11/1069* (2013.01)

(58) Field of Classification Search
None
See application file for complete search history.

(56) References Cited

U.S. PATENT DOCUMENTS

| 324,542 | A | * | 8/1885 | Demarest | ................ | E03C 1/244 |
| | | | | | | 210/463 |
| 438,465 | A | * | 10/1890 | Blessing | ................. | E03C 1/244 |
| | | | | | | 4/287 |

(Continued)

FOREIGN PATENT DOCUMENTS

| CN | 201037543 | 3/2008 |
| CN | 101913100 A | 12/2010 |

(Continued)

OTHER PUBLICATIONS

International Search Report and Written Opinion for PCT Patent Application No. PCT/CN2020/115577 mailed on Jun. 23, 2021.

(Continued)

*Primary Examiner* — Robert J Popovics
(74) *Attorney, Agent, or Firm* — McAndrews, Held & Malloy, Ltd.

(57) ABSTRACT

Provided are a recirculation system (200) for a material removal machine (102) and a material removal system (100). A material removal system (100) includes a recirculation system (200) in fluid communication with a material removal cabinet (104) housing a material removal machine (102). The recirculation system (200) may have an upper reservoir (300) configured to drain fluid into a lower reservoir (204) before recirculating the fluid. The upper reservoir (300) may have a standpipe (320) configured to allow swarf, debris, and/or other material within the fluid to be entrained prior to flowing over the standpipe (320).

20 Claims, 10 Drawing Sheets

(56) References Cited

U.S. PATENT DOCUMENTS

| | | | | |
|---|---|---|---|---|
| 706,526 A * | 8/1902 | Carlisle | E02B 5/08 | |
| | | | 169/DIG. 1 | |
| 767,210 A * | 8/1904 | Dietrich | C02F 1/004 | |
| | | | 210/129 | |
| 1,423,548 A * | 7/1922 | Gordon | A47L 17/02 | |
| | | | 134/91 | |
| 1,596,893 A * | 8/1926 | Schifter | E03C 1/262 | |
| | | | 4/292 | |
| 1,701,091 A * | 2/1929 | Zimmermann et al. | | |
| | | | B23Q 11/121 | |
| | | | 184/6.14 | |
| 1,708,235 A * | 4/1929 | Nugent | B01D 35/18 | |
| | | | 200/81.9 R | |
| 1,773,640 A * | 8/1930 | Prasivka | E03F 5/042 | |
| | | | 285/191 | |
| 2,065,347 A * | 12/1936 | Schulse | E03C 1/244 | |
| | | | 4/290 | |
| 2,140,289 A * | 12/1938 | Hurtt | B21B 45/0218 | |
| | | | 72/46 | |
| 2,142,726 A * | 1/1939 | Hetzer | C07C 17/38 | |
| | | | 203/41 | |
| 2,179,131 A * | 11/1939 | Millard | C10G 33/06 | |
| | | | 96/159 | |
| 2,266,043 A * | 12/1941 | Hutchins | E03C 1/244 | |
| | | | 4/680 | |
| 2,306,986 A * | 12/1942 | Tolman | B01D 39/2003 | |
| | | | 210/486 | |
| 2,426,817 A * | 9/1947 | Charlton | B23Q 11/141 | |
| | | | 184/6.24 | |
| 2,434,679 A * | 1/1948 | Wagner | B24B 55/02 | |
| | | | 451/7 | |
| 2,464,579 A * | 3/1949 | Hovanian | E03C 1/262 | |
| | | | 210/418 | |
| 2,482,302 A * | 9/1949 | Summers | B01D 29/56 | |
| | | | 210/335 | |
| 2,523,634 A * | 9/1950 | Pyle | C02F 1/686 | |
| | | | 137/593 | |
| 2,560,954 A * | 7/1951 | Jackson | E03C 1/244 | |
| | | | 4/680 | |
| 2,578,040 A * | 12/1951 | Booth | B03D 1/16 | |
| | | | 134/191 | |
| 2,618,356 A * | 11/1952 | Matheis | E04D 13/0409 | |
| | | | 285/356 | |
| 2,891,574 A * | 6/1959 | Dahlberg | F28F 25/02 | |
| | | | 137/577 | |
| 2,928,419 A * | 3/1960 | Kruse | E03F 5/042 | |
| | | | 285/191 | |
| 2,988,755 A * | 6/1961 | Roland | E03C 1/244 | |
| | | | 137/577 | |
| 3,075,203 A * | 1/1963 | Stafford | E03C 1/244 | |
| | | | 4/286 | |
| 3,289,218 A * | 12/1966 | Mehilos | A47J 47/20 | |
| | | | 4/654 | |
| 3,341,983 A * | 9/1967 | Baldenhofer | B23Q 11/1069 | |
| | | | 210/512.1 | |
| 3,408,843 A * | 11/1968 | Treat | B21B 45/0242 | |
| | | | 72/201 | |
| 3,409,551 A * | 11/1968 | Treat | C10M 173/00 | |
| | | | 508/180 | |
| 3,418,973 A * | 12/1968 | Saito | A01K 63/04 | |
| | | | 392/471 | |
| 3,430,767 A * | 3/1969 | Skirvin | B23Q 11/0042 | |
| | | | 210/167.01 | |
| 3,456,798 A * | 7/1969 | Urdanoff | B01D 21/009 | |
| | | | 210/776 | |
| 3,518,917 A * | 7/1970 | Sluhan | B23Q 11/1061 | |
| | | | 408/56 | |
| 3,618,707 A * | 11/1971 | Sluhan | B23Q 11/1069 | |
| | | | 184/6.14 | |
| 3,627,131 A * | 12/1971 | Goodman | B01D 24/14 | |
| | | | 210/741 | |
| 3,646,961 A * | 3/1972 | Marquardson | C25B 9/00 | |
| | | | 137/577 | |
| 3,750,847 A * | 8/1973 | Sluhan | B26D 7/088 | |
| | | | 184/6.14 | |
| 3,823,823 A * | 7/1974 | Dokter | B01D 29/01 | |
| | | | 210/791 | |
| 3,844,269 A * | 10/1974 | Rater | B23D 47/047 | |
| | | | 125/35 | |
| 3,897,335 A * | 7/1975 | Brandt | C10M 175/04 | |
| | | | 210/776 | |
| 3,954,611 A * | 5/1976 | Reedy | F16N 39/00 | |
| | | | 210/182 | |
| 4,015,369 A * | 4/1977 | Dietrick | B01D 3/00 | |
| | | | 210/167.01 | |
| 4,106,133 A * | 8/1978 | Roberts | A47K 3/022 | |
| | | | 4/655 | |
| 4,122,008 A * | 10/1978 | Allen | B01D 39/1623 | |
| | | | 210/197 | |
| 4,137,169 A * | 1/1979 | El-Hindi | B01D 29/09 | |
| | | | 210/406 | |
| 4,217,667 A * | 8/1980 | Whitehouse | E03C 1/26 | |
| | | | 4/290 | |
| 4,261,378 A * | 4/1981 | Otzen | B08B 3/006 | |
| | | | 137/577 | |
| 4,325,663 A * | 4/1982 | Lee | B23Q 11/1069 | |
| | | | 210/167.04 | |
| 4,483,774 A * | 11/1984 | Brill, deceased | B01D 17/0214 | |
| | | | 210/DIG. 5 | |
| 4,492,636 A * | 1/1985 | Burke | B01D 17/0205 | |
| | | | 210/705 | |
| 4,628,170 A * | 12/1986 | Furukawa | B23H 1/10 | |
| | | | 210/126 | |
| 4,772,402 A * | 9/1988 | Love | B01D 36/02 | |
| | | | 210/313 | |
| 4,797,205 A * | 1/1989 | Kitamura | E02B 15/102 | |
| | | | 210/171 | |
| 4,806,241 A * | 2/1989 | Holien | B01D 29/336 | |
| | | | 210/463 | |
| 4,872,997 A * | 10/1989 | Becker | B01D 17/0205 | |
| | | | 210/171 | |
| 4,980,070 A * | 12/1990 | Lieberman | B01D 17/0214 | |
| | | | 210/522 | |
| 5,071,567 A * | 12/1991 | Corcelle | B23H 1/10 | |
| | | | 210/791 | |
| 5,099,729 A * | 3/1992 | Miyano | B23B 3/06 | |
| | | | 451/388 | |
| 5,223,156 A * | 6/1993 | Maier | B28D 1/025 | |
| | | | 210/167.01 | |
| 5,223,688 A * | 6/1993 | Hosoda | B23H 1/10 | |
| | | | 137/577 | |
| 5,224,051 A * | 6/1993 | Johnson | B23Q 11/1061 | |
| | | | 700/169 | |
| 5,230,793 A * | 7/1993 | Lenhart | B01D 35/12 | |
| | | | 184/6.24 | |
| 5,244,586 A * | 9/1993 | Hawkins | B01D 36/045 | |
| | | | 210/776 | |
| 5,290,987 A * | 3/1994 | Davis | B23H 11/00 | |
| | | | 219/69.11 | |
| 5,298,161 A * | 3/1994 | Sieg | B23H 1/10 | |
| | | | 210/411 | |
| 5,331,769 A * | 7/1994 | Walton | B24B 55/03 | |
| | | | 451/449 | |
| 5,380,446 A * | 1/1995 | Bratten | B23Q 11/1069 | |
| | | | 184/6.24 | |
| 5,399,262 A * | 3/1995 | Hawkins | B01D 36/02 | |
| | | | 210/313 | |
| 5,417,849 A * | 5/1995 | McEwen | B01D 33/807 | |
| | | | 210/167.04 | |
| 5,454,937 A * | 10/1995 | Lewandowski | B01D 17/0211 | |
| | | | 210/DIG. 5 | |
| 5,456,147 A * | 10/1995 | Stange, Jr. | B23D 59/001 | |
| | | | 83/412 | |
| 5,456,829 A * | 10/1995 | Brown | C02F 1/56 | |
| | | | 210/219 | |
| 5,458,770 A * | 10/1995 | Fentz | B01D 17/0211 | |
| | | | 210/171 | |

(56) References Cited

U.S. PATENT DOCUMENTS

| | | | | |
|---|---|---|---|---|
| 5,466,380 A * | 11/1995 | Bratten | B01D 37/045 | 409/137 |
| 5,471,897 A * | 12/1995 | Wright | B23D 63/003 | 76/43 |
| 5,499,643 A * | 3/1996 | Vincent, Jr. | B08B 3/006 | 134/155 |
| 5,501,741 A * | 3/1996 | McMahon | B01D 61/145 | 134/13 |
| 5,593,596 A * | 1/1997 | Bratten | B01D 37/00 | 409/137 |
| 5,645,382 A * | 7/1997 | Homanick | B23P 25/00 | 409/137 |
| 5,772,871 A * | 6/1998 | Lyon | B01D 17/12 | 210/DIG. 5 |
| 5,772,900 A * | 6/1998 | Yorita | B01D 37/046 | 210/167.04 |
| 5,782,673 A * | 7/1998 | Warehime | B24C 5/02 | 451/36 |
| 5,800,104 A * | 9/1998 | Miyano | B01D 21/32 | 409/137 |
| 5,858,218 A * | 1/1999 | Setlock | B01D 29/945 | 210/197 |
| 5,874,008 A * | 2/1999 | Hirs | B01D 17/0208 | 210/708 |
| 5,948,274 A * | 9/1999 | Lyon | B01D 17/045 | 210/776 |
| 5,975,108 A * | 11/1999 | Cho | H01L 21/67017 | 137/205 |
| 5,983,910 A * | 11/1999 | Berger | B01D 17/00 | 134/115 R |
| 6,017,446 A * | 1/2000 | Harms | B23Q 11/1069 | 210/194 |
| 6,017,462 A * | 1/2000 | Rains | B01D 21/003 | 210/801 |
| 6,027,658 A * | 2/2000 | Soble | B01D 21/2483 | 210/801 |
| 6,053,158 A * | 4/2000 | Miyata | B28D 1/025 | 451/60 |
| 6,071,047 A * | 6/2000 | Nakai | B01D 17/00 | 409/137 |
| 6,096,198 A * | 8/2000 | Underhill | B01D 17/0214 | 210/123 |
| 6,110,386 A * | 8/2000 | Underhill | B23Q 11/1069 | 261/119.1 |
| 6,126,336 A * | 10/2000 | Ferrante | G03F 7/30 | 210/197 |
| 6,162,355 A * | 12/2000 | Mizuno | B01D 21/26 | 210/512.1 |
| 6,224,273 B1 * | 5/2001 | Ferrante | G03F 7/3092 | 396/617 |
| 6,295,665 B1 * | 10/2001 | Domenig | E03C 1/244 | 4/686 |
| 6,315,899 B1 * | 11/2001 | Hernandez | B01D 17/0214 | 210/197 |
| 6,343,610 B1 * | 2/2002 | Berger | B01D 17/085 | 134/108 |
| 6,382,887 B1 * | 5/2002 | Nakai | B23Q 11/0858 | 210/171 |
| 6,423,238 B2 * | 7/2002 | Hernandez | B01D 17/0214 | 210/511 |
| 6,435,198 B2 * | 8/2002 | Berger | B01D 17/085 | 134/110 |
| 6,460,549 B2 * | 10/2002 | Berger | B23Q 11/1069 | 134/76 |
| 6,471,854 B1 * | 10/2002 | Sebben | B01D 17/00 | 210/171 |
| 6,495,031 B1 * | 12/2002 | Bratten | B01D 29/096 | 210/392 |
| 6,500,344 B1 * | 12/2002 | Lee | B01D 29/70 | 210/197 |
| 6,508,944 B1 * | 1/2003 | Bratten | B23Q 11/1069 | 210/167.01 |
| 6,538,573 B2 * | 3/2003 | Mizuno | B24B 49/00 | 451/449 |
| 6,645,387 B2 * | 11/2003 | Naski | B01D 21/2433 | 210/534 |
| 6,708,737 B1 * | 3/2004 | Bratten | B23Q 11/005 | 141/286 |
| 6,840,042 B1 * | 1/2005 | Taylor | F16H 39/14 | 60/487 |
| 6,849,179 B1 * | 2/2005 | Taylor | B01D 35/027 | 184/6.24 |
| 6,911,142 B2 * | 6/2005 | Pahl | B23Q 11/0057 | 210/167.01 |
| 7,077,954 B2 * | 7/2006 | Bratten | F04D 7/045 | 210/167.29 |
| 7,165,919 B2 * | 1/2007 | Schweizer | B23Q 1/015 | 82/149 |
| 7,169,296 B2 * | 1/2007 | Humphrey | C02F 3/02 | 210/150 |
| 7,172,689 B2 * | 2/2007 | Bratten | B23Q 11/0057 | 210/167.02 |
| 7,202,439 B2 * | 4/2007 | Ishiwata | B23H 1/10 | 137/577 |
| 7,241,090 B2 * | 7/2007 | Reynders | B23Q 11/0053 | 409/137 |
| 7,338,606 B2 * | 3/2008 | Bratten | B23Q 11/0057 | 210/741 |
| 7,347,945 B2 * | 3/2008 | Amado | B01D 17/0208 | 166/267 |
| 7,913,704 B1 | 3/2011 | Abney, Sr. | | |
| 8,075,764 B2 * | 12/2011 | Yang | B01D 21/0027 | 210/167.01 |
| 8,157,992 B2 * | 4/2012 | Konig | B01D 65/02 | 210/167.04 |
| 8,875,537 B1 * | 11/2014 | Utathin | H01L 21/67109 | 62/373 |
| 8,894,852 B2 * | 11/2014 | Urban | B01D 21/30 | 210/220 |
| 8,926,837 B1 * | 1/2015 | Shumate | A47J 37/1223 | 210/DIG. 8 |
| 8,960,177 B2 * | 2/2015 | Grumbine | B28D 5/007 | 125/16.02 |
| 8,986,538 B2 * | 3/2015 | Ishihara | B01D 29/605 | 210/139 |
| 9,156,036 B2 * | 10/2015 | Yanakawa | B03B 11/00 | |
| 9,168,674 B2 * | 10/2015 | Walker | B28D 7/02 | |
| 9,186,606 B2 * | 11/2015 | Ishihara | B23Q 11/1069 | |
| 9,255,024 B2 * | 2/2016 | Urban | C02F 1/40 | |
| D753,790 S * | 4/2016 | Torgerud | D23/209 | |
| 9,315,407 B2 * | 4/2016 | Urban | C02F 1/42 | |
| 9,393,571 B2 * | 7/2016 | Hori | B03C 1/30 | |
| 9,528,915 B2 * | 12/2016 | Adiga | G06T 7/0004 | |
| 9,737,945 B2 * | 8/2017 | Nakajima | B23H 1/04 | |
| 9,834,915 B2 * | 12/2017 | Hanson | B01D 21/307 | |
| 9,969,104 B2 * | 5/2018 | Sever | G05D 7/0676 | |
| 10,059,021 B2 * | 8/2018 | Deng | B26D 7/088 | |
| 10,071,454 B2 * | 9/2018 | Forlong | B01D 45/02 | |
| 10,081,116 B2 * | 9/2018 | Adair | B23D 47/12 | |
| 10,112,136 B2 * | 10/2018 | Morris | B23Q 11/0067 | |
| 10,124,432 B2 * | 11/2018 | Masuda | B23H 11/00 | |
| 10,190,297 B2 * | 1/2019 | Hanson | A47K 1/04 | |
| 10,266,789 B2 * | 4/2019 | Tanaka | B21C 9/00 | |
| 10,364,180 B2 * | 7/2019 | Chen | C03C 15/00 | |
| 10,465,370 B2 * | 11/2019 | Donnelly | F16L 5/027 | |
| 10,473,558 B2 * | 11/2019 | Adiga | G01N 1/32 | |
| 10,695,882 B2 * | 6/2020 | Fujii | G05B 19/404 | |
| 10,940,601 B2 * | 3/2021 | Adair | B23D 47/12 | |
| 11,179,789 B2 * | 11/2021 | Uneda | B23H 1/10 | |
| 11,447,943 B2 * | 9/2022 | Donnelly | F16L 27/1275 | |
| 11,511,381 B2 * | 11/2022 | Ceckowski | B23D 59/006 | |
| D983,939 S * | 4/2023 | Mayberry | E03C 1/264 | D23/261 |
| 11,897,084 B2 * | 2/2024 | Kordus | B24B 27/0084 | |
| 12,179,299 B2 * | 12/2024 | Strombach | B23Q 11/1069 | |
| 2001/0052149 A1 * | 12/2001 | Domenig | E03C 1/244 | 4/686 |
| 2002/0108902 A1 * | 8/2002 | Naski | B01D 21/245 | 210/521 |

(56) References Cited

U.S. PATENT DOCUMENTS

| | | | | |
|---|---|---|---|---|
| 2002/0148814 A1* | 10/2002 | Ishiwata | B23H 7/265 | 219/69.17 |
| 2003/0218086 A1* | 11/2003 | Bratten | F04D 5/00 | 241/101.2 |
| 2004/0016052 A1* | 1/2004 | Domenig | E03C 1/18 | 4/654 |
| 2006/0275083 A1* | 12/2006 | Wimberger | E03F 5/0404 | 405/40 |
| 2009/0172870 A1* | 7/2009 | Hong | E03C 1/244 | 4/286 |
| 2011/0186503 A1* | 8/2011 | Holzmeier | B01D 21/0012 | 210/435 |
| 2011/0192803 A1* | 8/2011 | Holzmeier | B28D 7/02 | 210/741 |
| 2013/0319919 A1* | 12/2013 | Ishihara | B23Q 11/1069 | 210/104 |
| 2014/0102964 A1* | 4/2014 | Ishihara | B23Q 11/1069 | 210/140 |
| 2014/0116930 A1* | 5/2014 | Hori | B03C 1/30 | 210/167.01 |
| 2014/0124418 A1* | 5/2014 | Ishihara | B01D 29/66 | 210/86 |
| 2014/0130613 A1* | 5/2014 | Adiga | G01N 1/06 | 73/864.41 |
| 2014/0291228 A1* | 10/2014 | Ishihara | B23Q 11/1069 | 210/257.1 |
| 2015/0089729 A1* | 4/2015 | Usher | E03C 1/264 | 4/292 |
| 2015/0114889 A1* | 4/2015 | Yanakawa | B03B 11/00 | 209/158 |
| 2015/0115596 A1* | 4/2015 | Donnelly | F16L 5/12 | 285/42 |
| 2015/0217472 A1* | 8/2015 | Adair | B26D 1/12 | 83/72 |
| 2015/0321127 A1* | 11/2015 | Arent | E03C 1/264 | 210/232 |
| 2015/0368889 A1* | 12/2015 | Hanson | E03C 1/242 | 4/682 |
| 2017/0074755 A1* | 3/2017 | Adiga | G01N 1/36 | |
| 2017/0129138 A1* | 5/2017 | Sever | B28D 7/005 | |
| 2017/0369362 A1* | 12/2017 | Chen | C03C 15/00 | |
| 2019/0001518 A1* | 1/2019 | Adair | B26D 1/12 | |
| 2019/0118324 A1* | 4/2019 | Fujii | B23Q 11/0075 | |
| 2019/0262917 A1* | 8/2019 | Kordus | B23D 63/12 | |
| 2020/0047299 A1* | 2/2020 | Strombach | B23Q 11/10 | |
| 2020/0070266 A1* | 3/2020 | Kordus | F16B 39/284 | |
| 2020/0070294 A1* | 3/2020 | Ceckowski | G05B 19/404 | |
| 2020/0072324 A1* | 3/2020 | Kordus | F16H 7/12 | |
| 2020/0078894 A1* | 3/2020 | Noake | B23Q 11/0067 | |
| 2020/0078902 A1* | 3/2020 | Kordus | B24B 3/343 | |
| 2020/0122282 A1* | 4/2020 | Kobayashi | B01D 21/003 | |
| 2020/0179842 A1* | 6/2020 | Nishizawa | B01D 35/143 | |
| 2020/0290139 A1* | 9/2020 | Kordus | B23D 59/02 | |
| 2022/0111307 A1* | 4/2022 | Lanzrath | B01F 27/112 | |
| 2023/0018796 A1* | 1/2023 | Mayberry | E03C 1/264 | |
| 2023/0047592 A1* | 2/2023 | Ceckowski | B23Q 15/12 | |
| 2023/0119597 A1* | 4/2023 | Silver | E03C 1/24 | 4/681 |
| 2023/0311221 A1* | 10/2023 | Zhao | B23D 59/02 | 83/169 |
| 2023/0320529 A1* | 10/2023 | Sul | A47J 37/1285 | 99/403 |

FOREIGN PATENT DOCUMENTS

| | | | |
|---|---|---|---|
| CN | 102493156 | | 6/2012 |
| CN | 202824871 U | | 3/2013 |
| CN | 204148959 U | | 2/2015 |
| CN | 204639786 U | | 9/2015 |
| CN | 208553348 | | 3/2019 |
| JP | H0365660 U | | 6/1991 |
| JP | 2000154568 | | 6/2000 |
| JP | 2002264015 | | 9/2002 |
| JP | 2003019637 A | | 1/2003 |
| WO | 2018071247 | | 4/2018 |
| WO | WO-2018071247 A1 * | 4/2018 | B23D 45/02 |
| WO | 2020033535 A1 | | 2/2020 |

OTHER PUBLICATIONS

1 European Patent Office, Search Report, Application No. 20953581.4, dated Apr. 22, 2024, 7 pages.

* cited by examiner

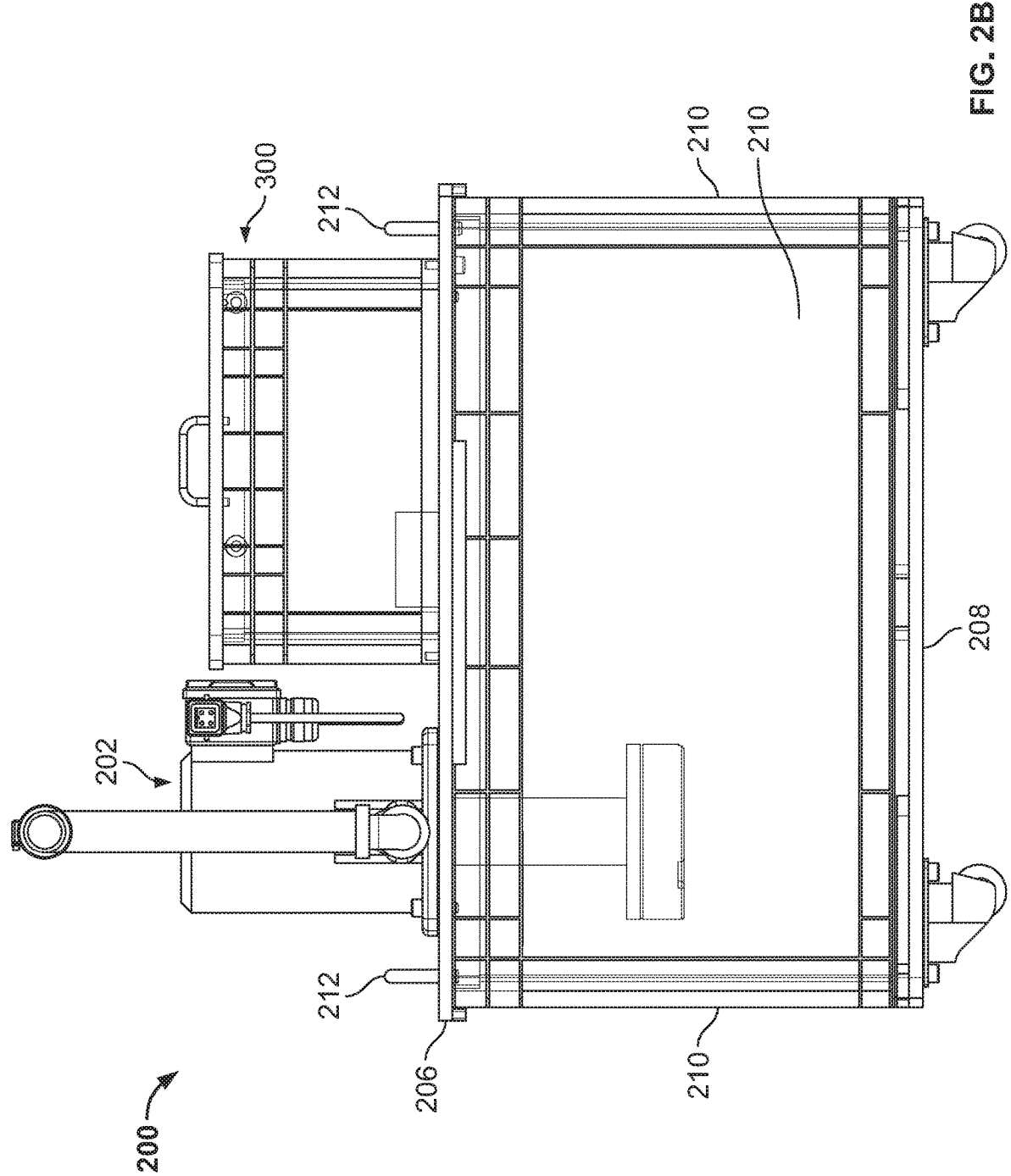

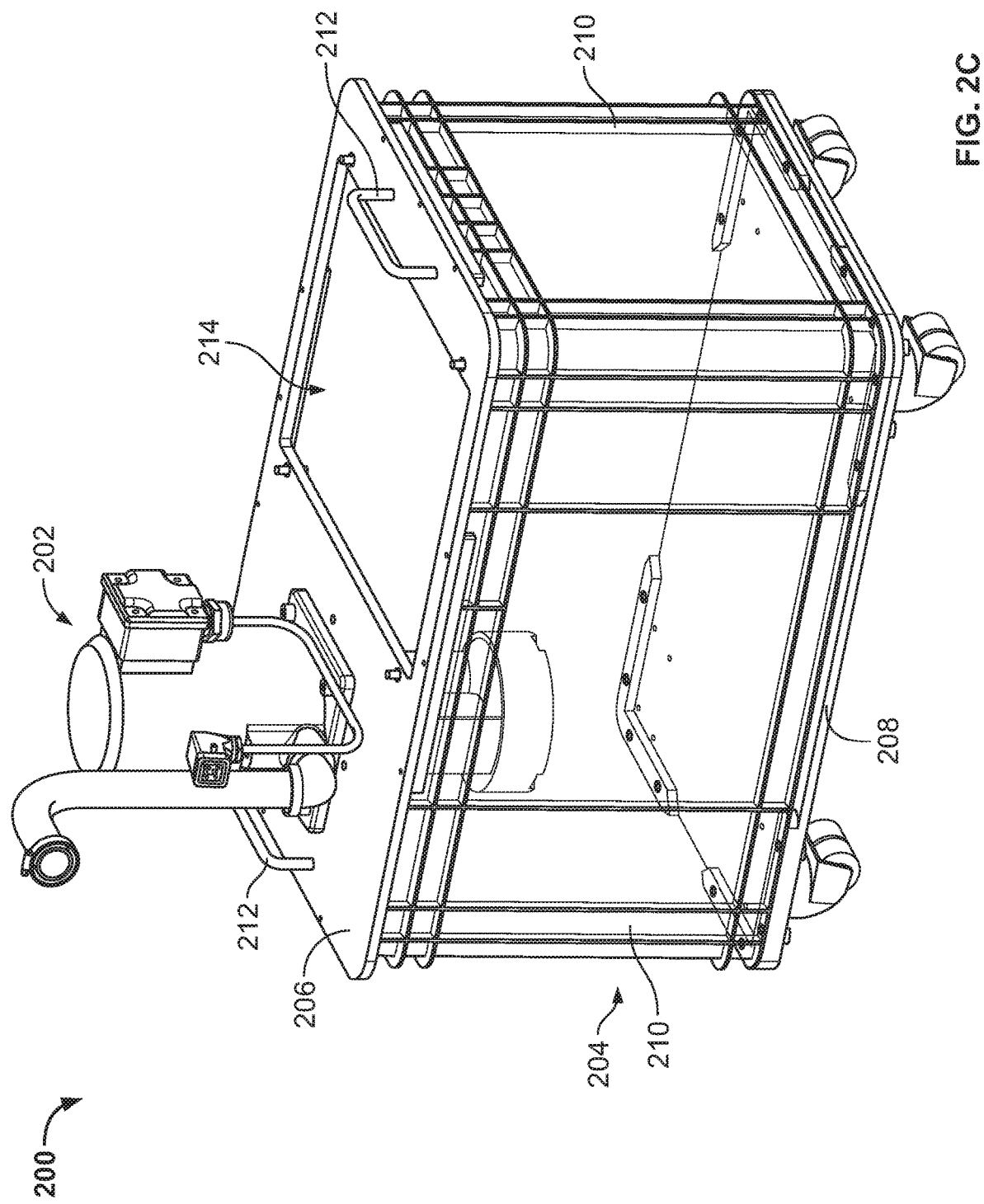

STANDPIPE RECIRCULATION SYSTEMS FOR MATERIAL REMOVAL MACHINES

TECHNICAL FIELD

The present disclosure generally relates to standpipe recirculation systems and, more particularly, to standpipe recirculation systems for material removal machines.

BACKGROUND

Some material removal machines (e.g., saws, grinders, polishers, and/or more general material preparation and/or testing machines) use fluid to wash away debris and/or swarf produced during the material removal process. In some cases, a continuous supply of fluid is provided to the material removal machine during the material removal process. Used fluid may be recaptured, recycled, and/or recirculated to provide the continuous supply of fluid for the material removal machine.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to standpipe recirculation systems for material removal machines, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

FIGS. 2a and 2b show perspective and front views, respectively, of an example recirculation system of the material removal system of FIG. 1, in accordance with aspects of this disclosure.

FIG. 2c is a perspective view of the recirculation system of FIGS. 2a and 2b with an upper reservoir removed, in accordance with aspects of this disclosure.

The figures are not necessarily to scale. Where appropriate, the same or similar reference numerals are used in the figures to refer to similar or identical elements.

DETAILED DESCRIPTION

Figure 1:
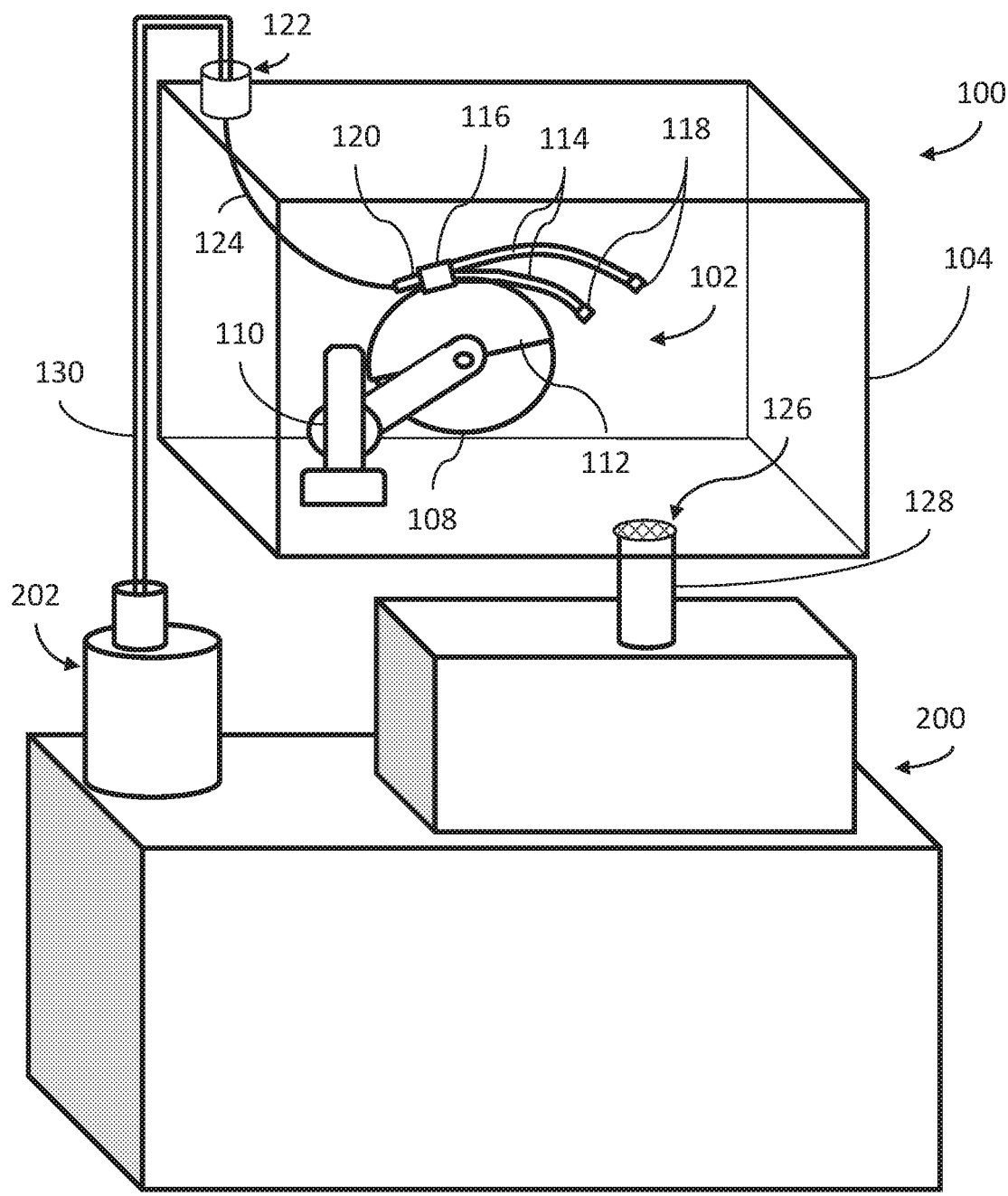
FIG. 1 shows an example material removal system, in accordance with aspects of this disclosure.

Some conventional recirculation systems use filters and/or filtration media to separate swarf and/or other particulate material from the fluid that is recirculated to the material removal machine. However, cleaning these filters and/or filtration media (in addition to other components) can be burdensome. Additionally, replacing the filters and/or filtration media can be expensive.

Disclosed example standpipe recirculation systems use a standpipe to separate swarf and/or other particulate material from recirculated fluid, rather than conventional filters and/or filtration media. In some examples, the standpipe blocks fluid from entering a drain in an upper reservoir that leads to a lower reservoir. In some examples, the height of the standpipe may be sufficient to allow swarf, debris, and/or other material within the fluid to be entrained prior to flowing over the standpipe into the lower reservoir.

Some examples of the present disclosure relate to a recirculation system for a material removal machine, comprising: a first reservoir having a floor with a drain; a second reservoir in fluid communication with the first reservoir through the drain; and a standpipe having walls that form a border around the drain within the first reservoir, the walls extending upwards away from the floor to a first height, such that fluid that accumulates on the floor within the first reservoir is blocked from flowing through the drain into the second reservoir until a top of the fluid in the first reservoir exceeds the first height, wherein the first reservoir is configured to permit settlement of material entrained in the fluid prior to the fluid exceeding the first height.

In some examples, the second reservoir is positioned below the drain of the first reservoir to receive the fluid falling through the drain. In some examples, the second reservoir is in fluid communication with a material removal cabinet housing the material removal machine. In some examples, the material removal machine comprises a sectioning saw. In some examples, the system further comprises a recirculation pump configured to pump the fluid from the second reservoir to the material removal cabinet.

In some examples, the system further comprises a removable lid shaped to conform to an opening in a ceiling of the first reservoir, the removable lid having a lid inlet configured for fluid communication with a cabinet outlet of a material removal cabinet housing the material removal machine, such that fluid can flow from the material removal cabinet to the first reservoir through the cabinet outlet and lid inlet. In some examples, the lid inlet is out of alignment with the drain when the removable lid is fit into the opening in the ceiling of the first reservoir. In some examples, the first reservoir is smaller than the second reservoir. In some examples, the first reservoir and the second reservoir do not include either of a filter or filtration media. In some examples, the height of the standpipe is based on a first capacity of the first reservoir and a second capacity of the second reservoir.

Some examples of the present disclosure relate to a material removal system, comprising: a material removal cabinet housing a material removal machine; a recirculation system in fluid communication with the material removal cabinet, the recirculation system comprising: a first reservoir having a floor with a drain; a second reservoir in fluid communication with the first reservoir through the drain; and a standpipe having walls that form a border around the drain within the first reservoir, the walls extending upwards away from the floor to a first height, such that fluid that accumulates on the floor within the first reservoir is blocked from flowing through the drain into the second reservoir until a top of the fluid in the first reservoir exceeds the first height, wherein the first reservoir is configured to permit settlement of material entrained in the fluid prior to the fluid exceeding the first height.

In some examples, the second reservoir is positioned below the drain of the first reservoir to receive the fluid falling through the drain. In some examples, the second reservoir is in fluid communication with the material removal cabinet housing the material removal machine. In some examples, the material removal system of claim 13, wherein the material removal machine comprises a sectioning saw. In some examples, the system further comprises a recirculation pump configured to pump the fluid from the second reservoir to the material removal cabinet.

In some examples, the system further comprises a removable lid shaped to conform to an opening in a ceiling of the first reservoir, the removable lid having a lid inlet configured for fluid communication with a cabinet outlet of a material removal cabinet housing the material removal machine, such that fluid can flow from the material removal cabinet to the first reservoir through the cabinet outlet and lid inlet. In some examples, the lid inlet is out of alignment with the drain when the removable lid is fit into the opening in the ceiling of the first reservoir. In some examples, the first reservoir is smaller than the second reservoir. In some examples, the first reservoir and the second reservoir do not include either of a filter or filtration media. In some examples, the height of the standpipe is based on a first capacity of the first reservoir and a second capacity of the second reservoir.

FIG. 1 shows an example of a material removal system 100. In the example of FIG. 1, the material removal system 100 includes a material removal machine 102 enclosed in a cabinet 104 and a recirculation system 200 in fluid communication with the cabinet 104. In the example of FIG. 1, the material removal machine 102 includes a material removal instrument 108, such as a (e.g., sectioning) saw blade, abrasive saw, grinder, polisher, and/or some other material removal instrument, for example. In the example of FIG. 1, the material removal instrument 108 is also encased within a shield 112. As shown, the shield 112 is attached to a cooling system.

In the example of FIG. 1, the cooling system includes several coolant hoses 114 attached to the shield 112 through a manifold 116. Each hose 114 terminates in a nozzle 118. The nozzles 118 are configured to spray (and/or otherwise provide) coolant into the cabinet 104. In the example of FIG. 1, the hoses 114 are configured to receive coolant from a hose inlet 120 that is also attached to the manifold 116. The hose inlet 120 is in fluid communication with a cabinet inlet 122 through a coolant tube 124. As shown, the coolant tube 124 is configured to route coolant from the cabinet inlet 122, through the coolant tube 124 to the hose inlet 120. The coolant introduced into the cabinet 104 by the coolant system may serve to cool and/or clean the material removal machine 102 and/or other components of the material removal system 100, while also removing debris, swarf, and/or other particulate material from the cabinet 104.

In the example of FIG. 1, the cabinet 104 further includes a cabinet outlet 126. As shown, the cabinet outlet 126 comprises a porous sieve (and/or mesh, filter, screen, etc.) configured to allow coolant to pass while prohibiting larger particulate matter (e.g., dislodged, freed, and/or unattached components of the material removal machine 102) from passing. In some examples, the cabinet outlet 126 may omit the sieve, and may simply comprise an opening. In the example of FIG. 1, the cabinet outlet 126 is in fluid communication with an outlet pipe 128 that leads to an inlet of the coolant recirculation system 200.

In the example of FIG. 1, the recirculation system 200 is positioned below the cabinet 104, such that the force of gravity may be sufficient to propel the coolant through the outlet pipe 128 to the recirculation system 200. In some examples, the recirculation system 200 may instead be positioned above and/or to the side of the cabinet 104, and/or some other force (e.g. a pump) may propel the coolant through the outlet pipe 128 from the cabinet 104 to the recirculation system 200. In the example of FIG. 1 (and FIGS. 2a-2b), the recirculation system 200 further includes a pump 202 configured to propel recaptured coolant from the recirculation system 200 through a conduit 130 to the cabinet inlet 122 of the cabinet 104.

Figure 2A:
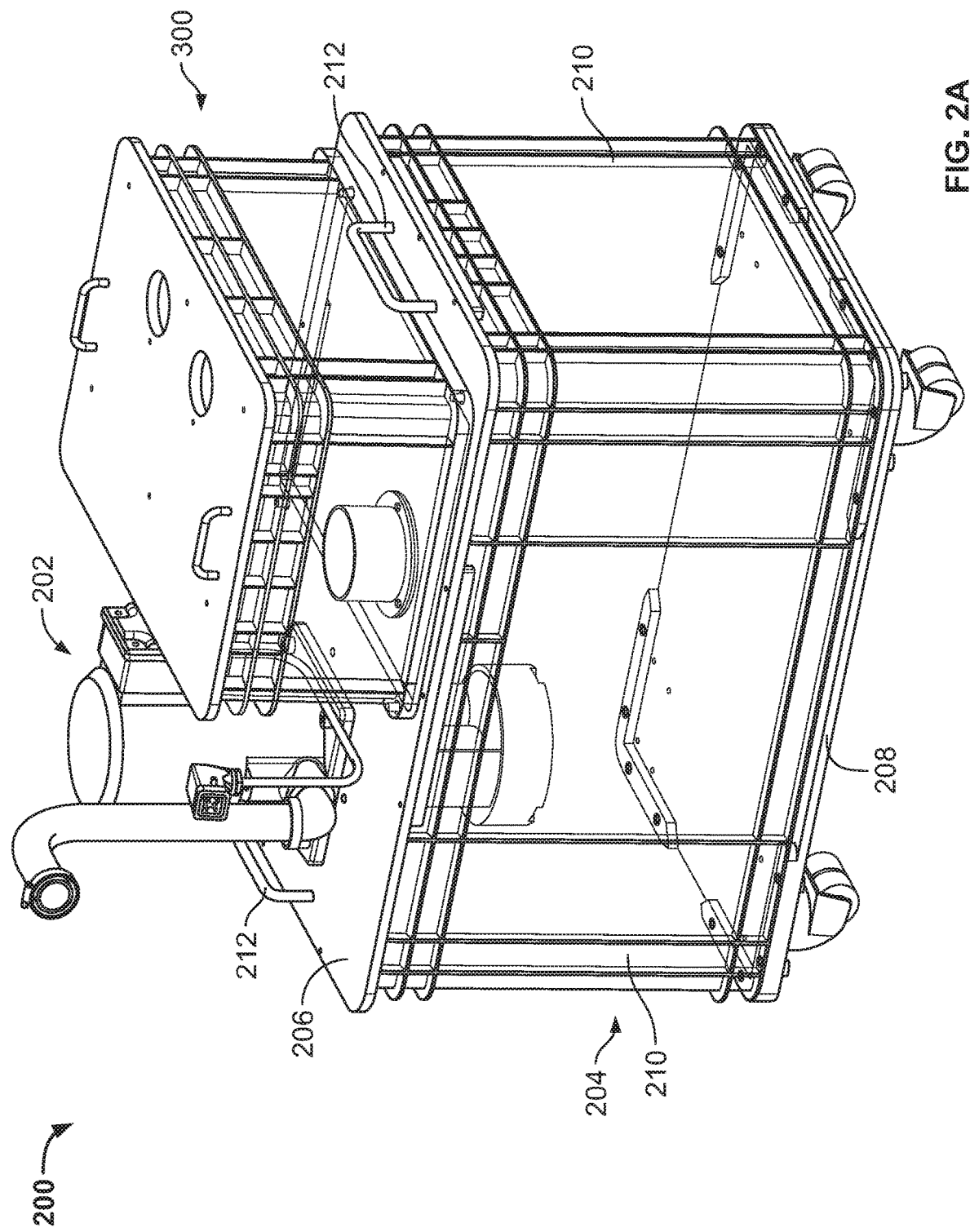

FIGS. 2a and 2b show perspective and front views, respectively, of an example recirculation system 200. As shown, the recirculation system 200 includes an upper reservoir 300 and a lower reservoir 204. The pump 202 is retained by a lower lid 206 of the lower reservoir 204, and extends some distance into the lower reservoir 204, so as to intake coolant collected by the lower reservoir 204 and pump the fluid back to the cabinet 104. For the sake of explanation and/or understanding, the walls of the upper reservoir 300 and lower reservoir 204 have been depicted as transparent in certain drawing figures (e.g., FIGS. 2a-2c and FIGS. 3b-3c).

In the examples of FIGS. 2a-2b, the lower reservoir 204 is significantly larger than the upper reservoir 300 (e.g., three to four times as large). In some examples, the larger size of the lower reservoir 204 may reflect an intention for the lower reservoir 204 to serve as the primary reservoir and/or primary storage for the coolant fluid before recirculation. In some examples, the smaller size of the upper reservoir 300 may make it easier to carry and/or clean, allowing the upper reservoir 300 to serve more as an intermediate and/or filtering reservoir.

In some examples, the lower reservoir 204 (and/or recirculation system 200 in general) may also be sized so that the recirculation system 200 can fit comfortably beneath, and/or approximately within the perimeter of, the material removal cabinet 104. In FIG. 1, for example, the cabinet 104 and recirculation system 200 are vertically aligned, with a similar width, such that the material removal cabinet 104 and recirculation system 200 form an approximate rectangle or cube. Such a configuration may allow the material removal system 100 as a whole to be stored together in a neat, compact, and/or aesthetically pleasing arrangement.

In the examples of FIGS. 2a-2b, the lower reservoir 204 is a hollow cube (and/or cuboid) having a lower floor 208 connected to four lower sidewalls 210 that are themselves connected together to form an upper opening opposite the floor 208. The lower lid 206 is shaped to fit into that opening, and creates a ceiling for the lower reservoir 204 when inserted into the opening. In some examples, the lower lid 206 may be removable from the lower reservoir 204 (e.g. using lower handles 212), so that the interior of the lower reservoir 204 may be accessed and/or cleaned. In some examples, the lower lid 206 (and/or lower sidewalls 210) may include features to make securement and/or removal of the lower lid 206 easier, such as complementary lips, rims, ledges, joints, pillars, recesses, protrusions, and/or flanges. In some examples, fasteners may be used to secure the lower lid 206 to the upper reservoir 300, and such fasteners may be configured for relatively simple loosening and/or removable in order to allow the lower lid 206 to be removed non-destructively.

In the examples of FIGS. 2a-2b the upper reservoir 300 is retained on top of the lower reservoir 204. However, in some examples, the upper reservoir 300 may be configured for removal from the lower reservoir 204 and/or recirculation system 200. FIG. 2c, for example, shows a view of the recirculation system 200 with the upper reservoir 300 removed. As shown, a window 214 is visible in the lower lid 206 of the lower reservoir 204 when the upper reservoir 300 is removed. In some examples, the window 214 may be sized and/or configured to receive the upper reservoir 300. In some examples, coolant fluid may flow from the upper reservoir 300 to the lower reservoir 204 through the window 214 of the lower reservoir 204.

In some examples, the lower lid 206 may include retaining features to help removably retain the upper reservoir 300 on the lower reservoir 204 (e.g., over and/or in the window 214). In some examples, the retaining features may enable the upper reservoir 300 to be securely retained on the lower reservoir 204 during operation, and also allow the upper reservoir 300 to be non-destructively removed from the lower reservoir 204 when desired (e.g., for cleaning). In some examples, the upper reservoir 300 may comprise complementary retaining features. Such retaining features may comprise, for example, lips, rims, ledges, joints, pillars, recesses, protrusions, fasteners, and/or flanges.

FIGS. 3a-3e show various views of the upper reservoir 300. As shown, the upper reservoir 300 is a hollow cube (and/or cuboid) having an upper floor 308 connected to four upper sidewalls 310 that are themselves connected together to form an upper opening opposite the floor 308. An upper lid 306 is shaped to fit into that upper opening. The upper lid 306 creates a ceiling for the upper reservoir 300 when inserted into the opening, which may help to keep out unwanted debris and/or limit loss of fluid (e.g., via splashing).

In some examples, the upper lid 306 may be removable from the upper reservoir 300 (e.g. using upper handles 312), so that the interior of the upper reservoir 300 may be accessed and/or cleaned. In some examples, the upper lid 306 may be omitted entirely. In some examples, the upper lid 306 (and/or upper sidewalls 310) may include features to make securement and/or removal of the upper lid 306 easier, such as complementary lips, rims, ledges, joints, pillars, recesses, protrusions, fasteners, and/or flanges configured to removably secure the upper lid 306 to the upper reservoir 300 such that the upper lid 306 may be removed non-destructively. FIGS. 3d-3e show perspective and top plan views of the upper reservoir 300 with the upper lid 306 removed.

Figure 3A:
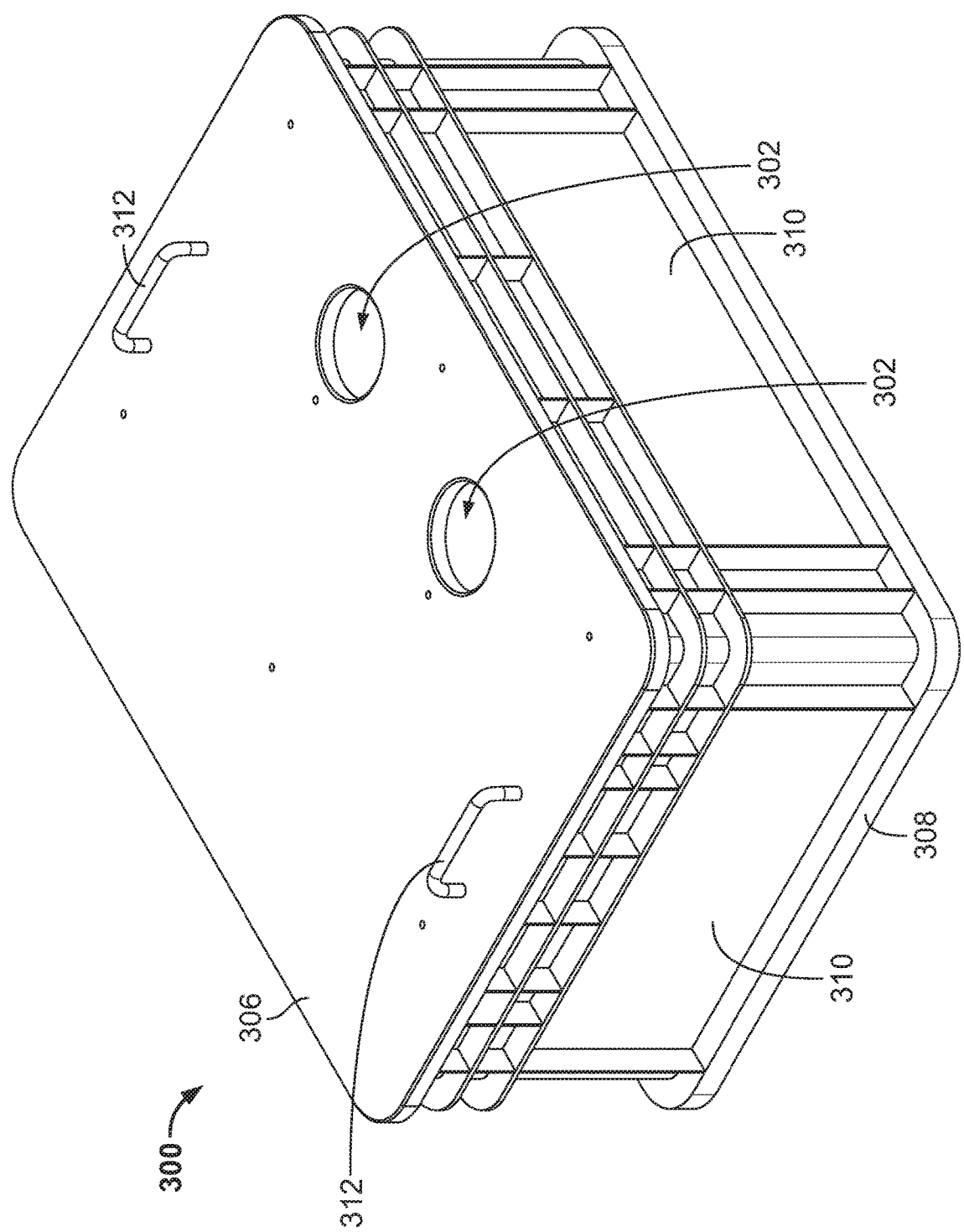
FIGS. 3a-3e show various views of the upper reservoir of the recirculation system of FIGS. 2a and 2b, in accordance with aspects of this disclosure.
Figure 3B:
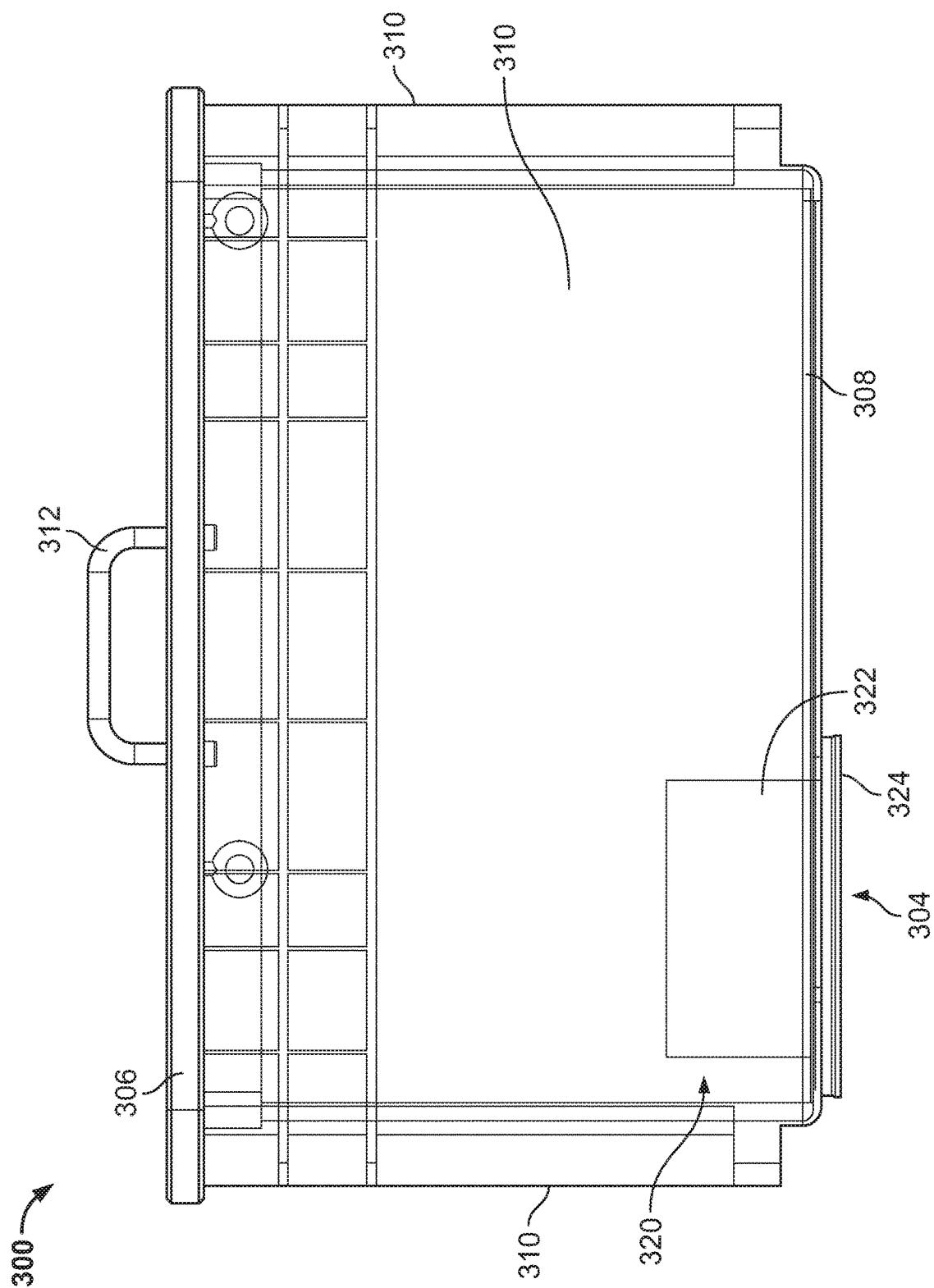
Figure 3C:
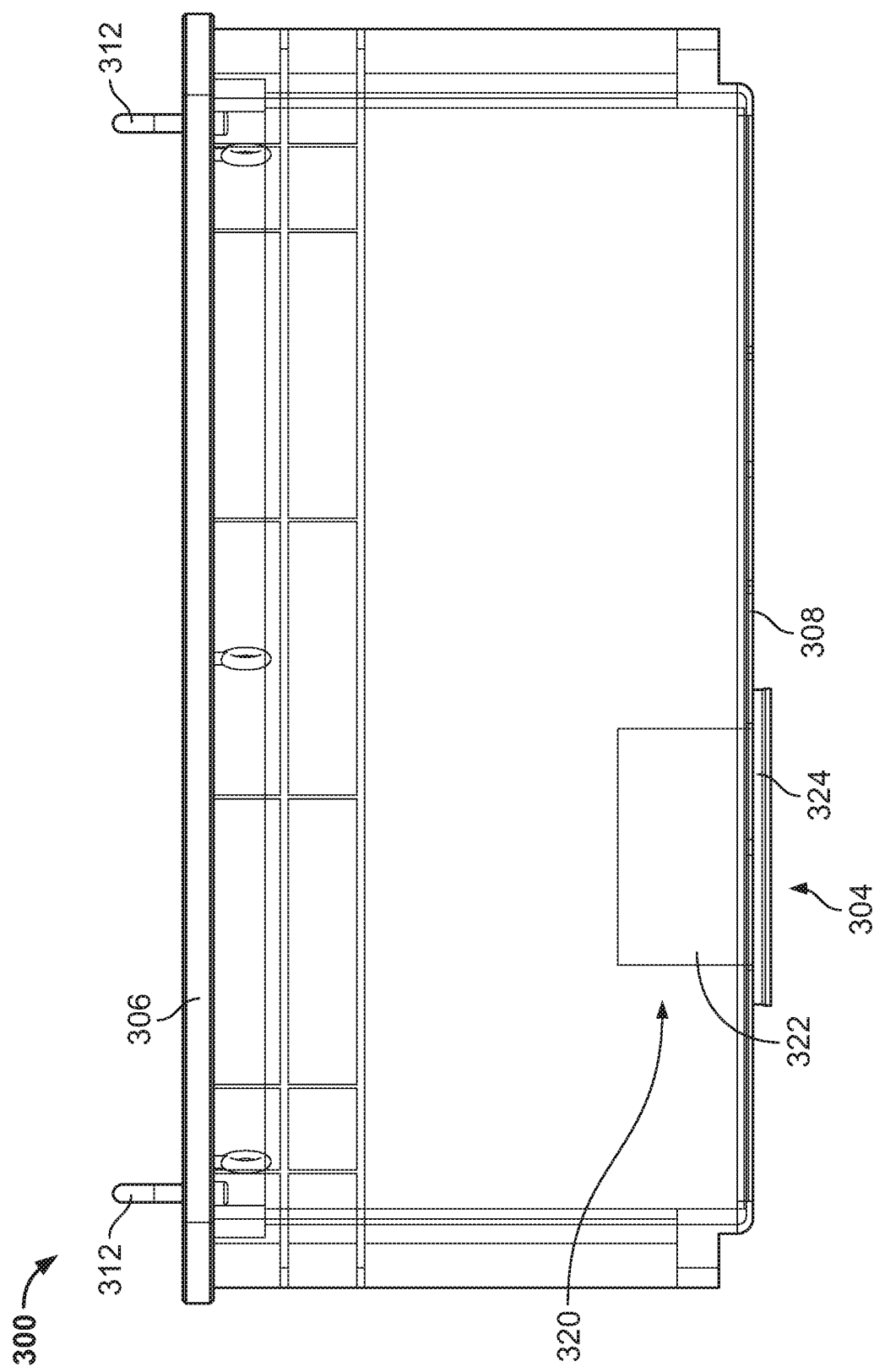
Figure 3E:
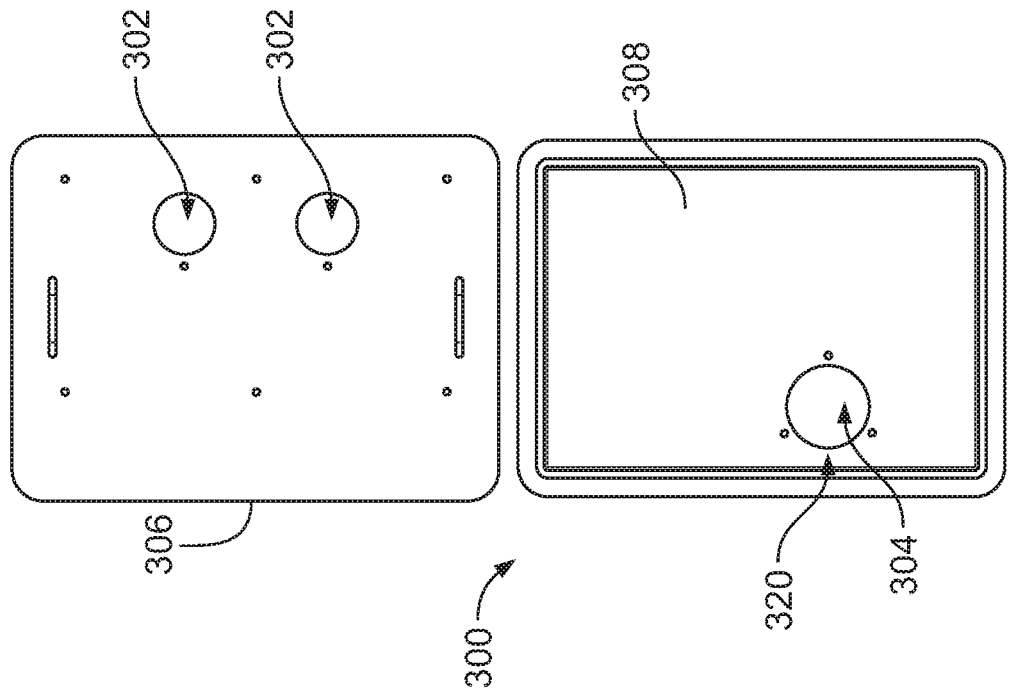
Figure 3D:
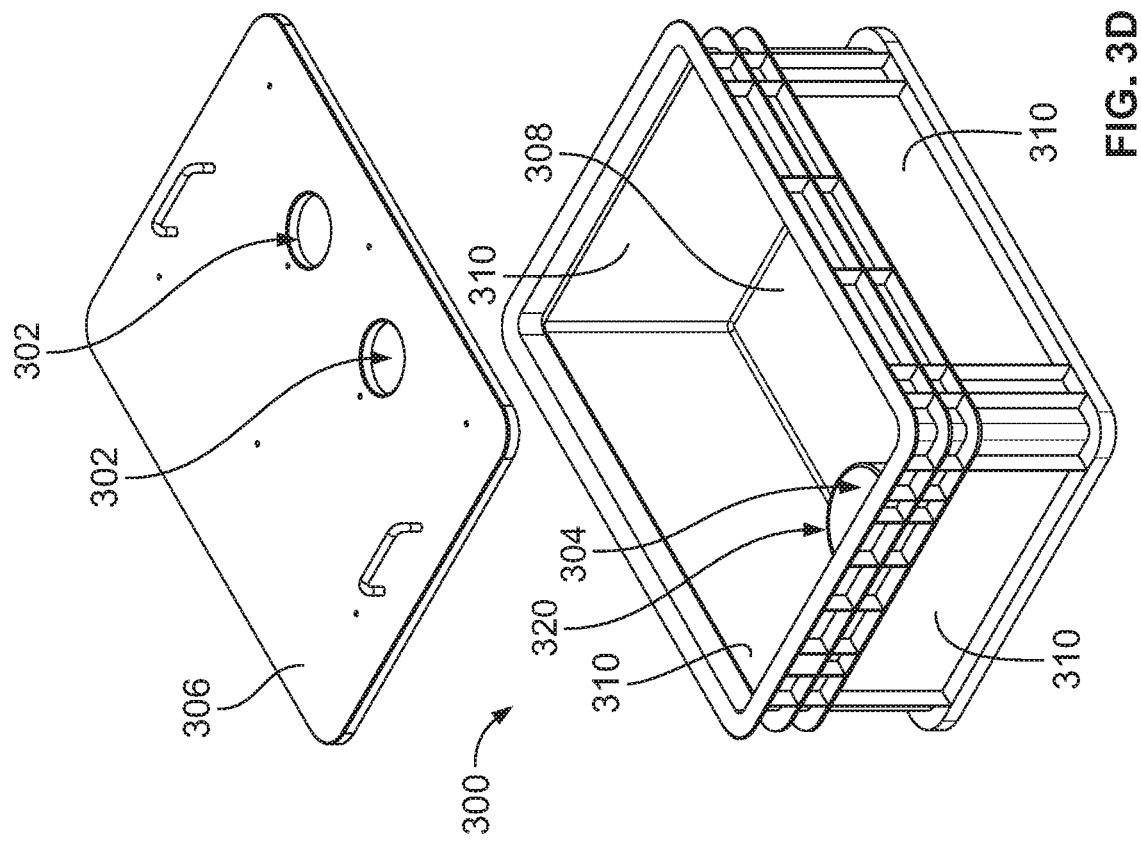

In the examples of FIGS. 3a and 3d-3e, the upper lid 306 includes two lid inlets 302. In some examples, one of the two lid inlets 302 may be aligned with the outlet pipe 128 to receive coolant fluid from the cabinet 104. In some examples, having two lid inlets 302 may allow flexibility in positioning the upper reservoir 300 to align with the outlet pipe 128.

In some examples, the aligned lid inlet(s) 302 may help to position the outlet pipe 128 at an appropriate height, so that there exists an air gap between a top of the fluid retained in upper reservoir 300 and a bottom of the outlet pipe 128. In some examples, this air gap may help prevent backflow, clogging, and/or other detrimental impact. In some examples, the lid inlet 302 that is not aligned with the outlet pipe 128 may be used as a vent. In some examples, the lid inlet 302 that is not aligned with the outlet pipe 128 may be covered. In some examples, there may be two (or more) outlet pipes 128, with each outlet pipe 128 aligned with a lid inlet 302. In some examples, the upper lid 306 may include only one lid inlet 302 or three or more lid inlets 302.

In the examples of FIGS. 3b-3e, the upper reservoir 300 includes a drain 304 in its upper floor 308. With the upper reservoir 300 positioned atop the window 214 in the lower lid 206, coolant fluid flowing through the drain 304 will flow into the lower reservoir 204 under the force of gravity. In some examples, a drain pipe may help guide fluid flowing through the drain 304 into the lower reservoir 204.

In the examples of FIGS. 3b-3e, the upper reservoir 300 also includes a standpipe 320. While one standpipe 320 is shown, in some examples, multiple standpipes 320 (and/or multiple drains 304) may be within the upper reservoir 300. In the examples of FIGS. 3d-3e, the standpipe 320 and drain 304 are offset and/or out of alignment with the lid inlets 302, so that fluid entering the upper reservoir 300 through the lid inlets 302 will not flow directly into the drain 304. In some examples, fluid (and/or the outlet pipe 128) may be directed through the lid inlets 302 to a position within the upper reservoir 300 opposite the standpipe 320 and/or drain 304, so as to allow fluid time and/or space to settle and/or become less turbulent before encountering the standpipe 320 and/or drain 304.

As best shown in FIGS. 3b and 3c, the standpipe 320 has a base 324 underneath the upper floor 308. In some examples, the base 324 may be affixed to an underside of the upper floor 308 of the upper reservoir 300. In some examples, the base 324 (and/or standpipe 320) may be affixed to a top side of the upper floor 308 of the upper reservoir 300. In some examples, the standpipe 320 may be molded with the upper floor 308. In some examples, the standpipe 320 may be friction fit into the drain 304.

In the examples of FIGS. 3b-3c, the standpipe 320 has walls 322 extending upwards from the base 324, through the drain 304, and into the upper reservoir 300. Within the upper reservoir 300, the walls 322 extend upwards away from the upper floor 308. As shown, the walls 322 form a border around the drain 304 to block fluid on the upper floor 308 from flowing directly into the drain 304.

In the examples of FIGS. 3b-3c, the walls 322 of the standpipe 320 extend upwards away from the floor 308 to a standpipe height. In some examples, only coolant fluid that accumulates and/or pools in the upper reservoir to a height greater than the standpipe height can flow over the walls 322 of the standpipe 320 and through the drain 304 (and window 214) into the lower reservoir 204. In some examples, the time required for coolant entering the upper reservoir 300 to reach the standpipe height may be enough to allow swarf, debris, and/or other particulate material entrained in the coolant fluid to settle to the upper floor 308 of the upper reservoir 300. As a result, the swarf, debris, and/or other particulate material settles below the top of the standpipe 320, and is not carried through the drain 304 to the lower reservoir 204. Thus, in some examples, the standpipe 320 may enable the recirculation system 200 to separate swarf, debris, and/or other particulate matter from the recirculating coolant fluid without the use of conventional filters and/or filtration media.

In the examples of FIGS. 3b-3c, the standpipe height is between approximately a quarter and a third of the height of the upper reservoir 300. In some examples, the standpipe height may be more or less than this height. In some examples, the standpipe height may be larger or smaller. In some examples, the standpipe height is less than an upper height threshold at which there is a risk of starving the pump 202 of coolant fluid. For example, at an upper height threshold, the standpipe 320 may cause the upper reservoir 300 to retain so much of the fluid that there is a risk the fluid level in the lower reservoir 204 will remain too low for the pump 202 to intake fluid for recirculation to the cabinet 104 (i.e., thereby starving the pump 202). In some examples, the upper height threshold is dependent on the relative sizes of the upper reservoir 300 and lower reservoir 204, as well as how far the pump 202 extends into the lower reservoir 204, a total fluid amount in the system, and/or other factors.

Figure 4:
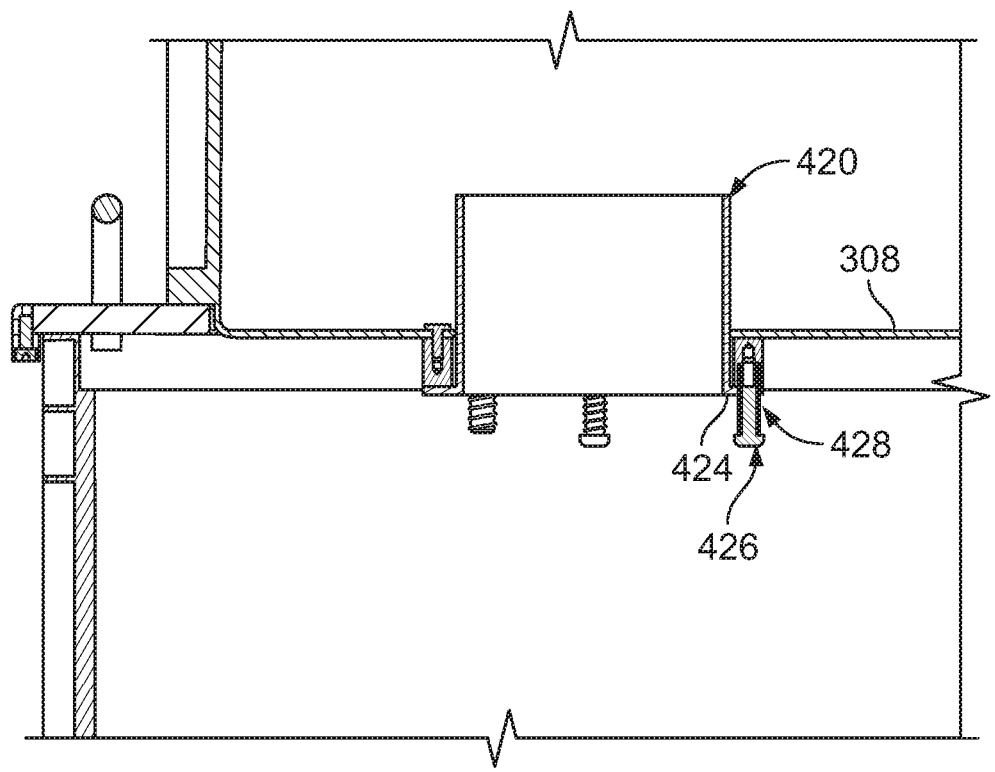
FIGS. 4 and 5 show examples of alternative standpipes, in accordance with aspects of this disclosure.

FIG. 4 shows an example of another example standpipe 420 that may be used instead of the standpipe 320 illustrated in FIGS. 3a-3e. As shown, the example standpipe 420 has a base 424 affixed to the upper floor 308 of the upper reservoir 300 with fasteners 426 that extend through compressible springs 428. The springs 428 serve to bias the standpipe 420 upwards. The fasteners 426 are mounted with shafts that extend downwards from the upper floor 308, such that the base 424 (and connected standpipe 420) can move downwards on and/or over the fasteners 426 when supplied with sufficient downward force (e.g., via an operator) to overcome the bias of the springs 428. Thus, the standpipe 420 may be moved to a lower height via the fasteners 426 and springs 428.

In some examples, the fasteners 426 may have shaft of sufficient length to allow the standpipe 420 to be moved down to half (or less) the standpipe height, a quarter (or less) the standpipe height, the height of the upper floor 308 and/or drain 304, or slightly above the height of the upper floor 308 and/or drain 304. Once the standpipe height is lowered, the upper reservoir 300 may be more easily evacuated of fluid. Once the fluid is evacuated, the upper reservoir 300 may be more easily removed from the recirculation system 200 (e.g., for cleaning). After the fluid is gone, and the downward force is removed, the biasing force of the springs 428 may push the standpipe 420 back up to the original standpipe height.

Figure 5:
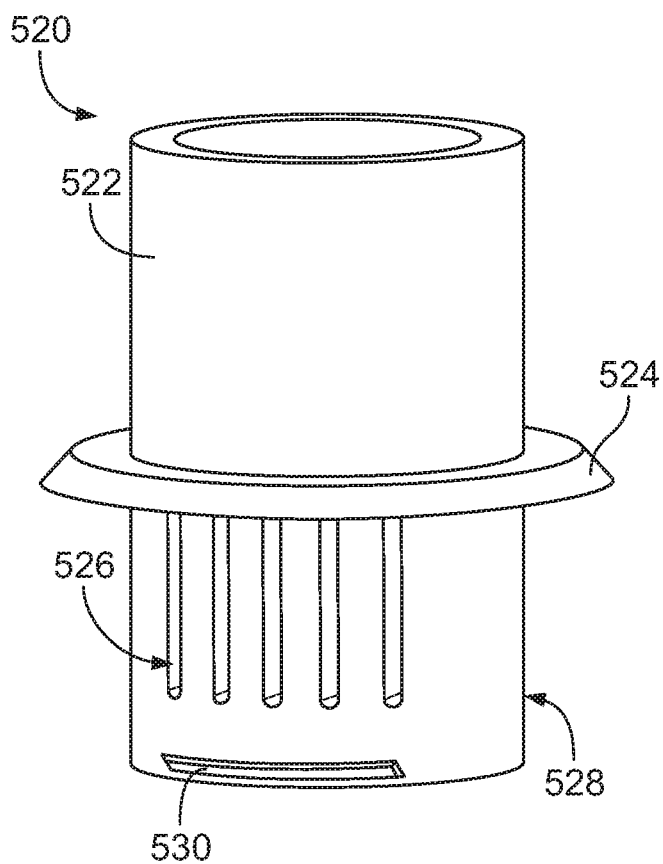

FIG. 5 shows another example standpipe 520. As shown, the standpipe 520 is configured to be pulled up rather than pushed down to remove any remaining fluid in the upper reservoir 300. As shown, the standpipe 520 has a lower portion 528 that is normally positioned below the base 524, and underneath the upper floor 308 of the upper reservoir 300. When pulled up (e.g., by an operator), a lower portion 528 of the alternative standpipe 520 will enter the upper reservoir 300 from below, and form the border around the drain 304.

In the example of FIG. 5, the lower portion 528 of the second alternative standpipe 520 has slits 526. In some examples, the slits 526 may be made narrow enough to operate as a coarse filter. In some examples, the slits 526 may instead be holes, or other shaped openings. In some examples, when the standpipe 520 is raised, the fluid in the upper reservoir 300 can flow through the slits 526 and into the drain 304, regardless of the fluid height. As shown, the lower portion 528 of the walls 522 additionally has a jutting protrusion 530 that prevents the second alternative standpipe 520 from being pulled up past the base 524. Thus, in some examples, the second alternative standpipe 520 may allow an operator to easily drain fluid from the upper reservoir 300 by raising the lower portion 528 of the second alternative standpipe 520, and allowing the fluid to drain through the slits 526.

The example recirculation systems 200 disclosed herein enable separation of swarf, debris, and/or other particulate material from recirculated fluid without the use of conventional filters and/or filtration media. The lack of conventional filters and/or filtration media may facilitate easier cleaning and/or lower cost. However, conventional filters and/or filtration may also be used with the example recirculation systems 200 described herein, if desired.

Figure 6:
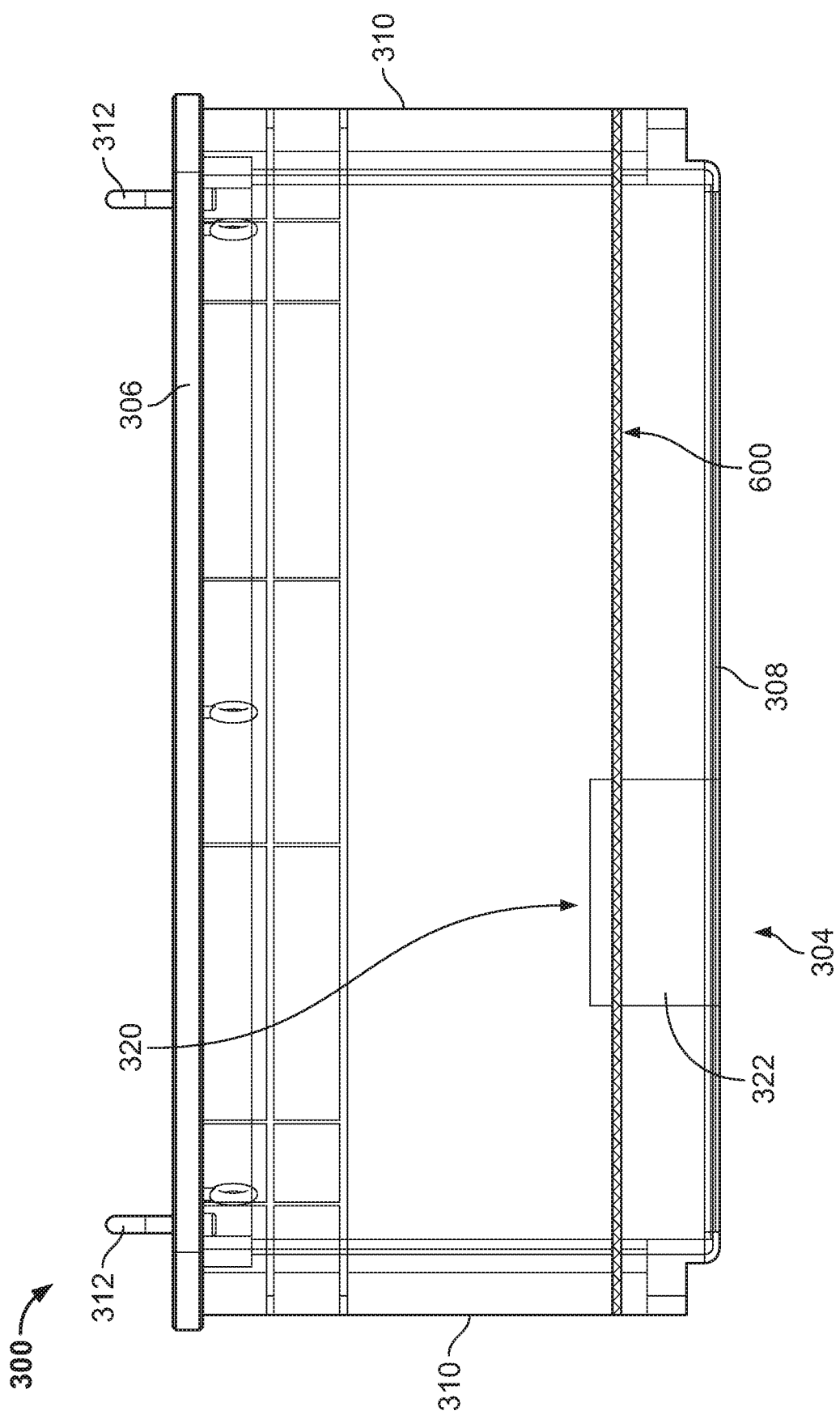
FIG. 6 shows an example of a filter used with the upper reservoir of FIGS. 3a-3e, in accordance with aspects of this disclosure.

FIG. 6, for example, shows an example of a filter 600 positioned within the upper reservoir 300. As shown, the filter 600 extends horizontally across the upper reservoir, from sidewall 310 to sidewall 310, at a height above the upper floor 308, and below the height of the standpipe 320. In some examples, the filter 600 may be tightly fitted around the standpipe 320. In some examples, the outlet pipe 128 of FIG. 1 drains the fluids from the cabinet 104 to the volume between the upper floor 308 and the filter 600. Thus, fluid rising from the upper floor 308 to the standpipe height may have to pass through the filter 600 before going through the drain 304. In some examples, the filter 600 may have one or more openings aligned with the inlet(s) 302, to allow fluid to enter the upper reservoir 300 without passing through the filter 600. In some examples, the outlet pipe 128 may extend into the upper reservoir 300 (e.g., through an inlet 302) to better direct fluid to the opening(s) in the filter 600.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein, the term "fluid," when used as a noun, refers to a free-flowing deformable substance with no fixed shape, including, inter alia, liquid (e.g., water, solution, etc), and/or plasma.

What is claimed is:
1. A recirculation system for a material removal machine, comprising:
a first reservoir having an opening and a floor with a drain;
a removable lid shaped to conform to the opening in the first reservoir, the removable lid having a lid inlet, such that fluid can flow into the first reservoir through the lid inlet from a cabinet outlet of a material removal cabinet housing the material removal machine;

a second reservoir in fluid communication with the first reservoir through the drain; and a standpipe having walls that form a border around the drain within the first reservoir, the walls extending upwards away from the floor to a first height, such that fluid that accumulates on the floor within the first reservoir is blocked from flowing through the drain into the second reservoir until a top of the fluid in the first reservoir exceeds the first height.

2. The recirculation system of claim 1, wherein the second reservoir is positioned below the drain of the first reservoir to receive the fluid falling through the drain.

3. The recirculation system of claim 1, wherein the second reservoir is in fluid communication with the material removal cabinet housing the material removal machine.

4. The recirculation system of claim 3, wherein the material removal machine comprises a sectioning saw.

5. The recirculation system of claim 3, further comprising a recirculation pump configured to pump the fluid from the second reservoir to the material removal cabinet.

6. The recirculation system of claim 1, wherein the opening is a first opening, the recirculation system further comprising a second lid shaped to conform to a second opening in the second reservoir, the second lid having a window sized to receive the first reservoir.

7. The recirculation system of claim 6, further comprising a recirculation pump retained by the second lid.

8. The recirculation system of claim 1, wherein the lid inlet is out of alignment with the drain when the removable lid is fit into the opening of the first reservoir.

9. The recirculation system of claim 1, wherein the first reservoir is smaller than the second reservoir.

10. The recirculation system of claim 1, wherein the first reservoir and the second reservoir do not include either of a filter or filtration media.

11. The material removal system of claim 1, wherein the lid inlet is out of alignment with the drain when the removable lid is fit into the opening of the first reservoir.

12. A material removal system, comprising:

a material removal cabinet housing a material removal machine; and a recirculation system in fluid communication with the material removal cabinet, the recirculation system comprising:

a first reservoir having a lid an opening and a floor with a drain, a removable lid shaped to conform to the opening in the first reservoir, the removable lid having a lid inlet, such that fluid can flow into the first reservoir through the lid inlet from a cabinet outlet of the material removal cabinet housing the material removal machine, a second reservoir in fluid communication with the first reservoir through the drain, and a standpipe having walls that form a border around the drain within the first reservoir, the walls extending upwards away from the floor to a first height, such that fluid that accumulates on the floor within the first reservoir is blocked from flowing through the drain into the second reservoir until a top of the fluid in the first reservoir exceeds the first height.

13. The material removal system of claim 12, wherein the second reservoir is positioned below the drain of the first reservoir to receive the fluid falling through the drain.

14. The material removal system of claim 12, wherein the second reservoir is in fluid communication with the material removal cabinet housing the material removal machine.

15. The material removal system of claim 14, wherein the material removal machine comprises a sectioning saw.

16. The material removal system of claim 14, further comprising a recirculation pump configured to pump the fluid from the second reservoir to the material removal cabinet.

17. The material removal system of claim 12, wherein the opening is a first opening, the recirculation system further comprising a second lid shaped to conform to a second opening in the second reservoir, the second lid having a window sized to receive the first reservoir.

18. The material removal system of claim 17, further comprising a recirculation pump retained by the second lid.

19. The material removal system of claim 12, wherein the first reservoir is smaller than the second reservoir.

20. The material removal system of claim 12, wherein the first reservoir and the second reservoir do not include either of a filter or filtration media.

* * * * *